April 26, 1966  T. WEBER, JR  3,248,624
TAPE CONTROLLED DIGITAL SYNCHRO SIMULATOR FOR SHAFT CONTROL
Filed Aug. 3, 1962  3 Sheets-Sheet 1

INVENTOR
THEODORE WEBER, JR.
BY
Byerly, Townsend, Watson & Churchill
ATTORNEYS.

April 26, 1966  T. WEBER, JR  3,248,624
TAPE CONTROLLED DIGITAL SYNCHRO SIMULATOR FOR SHAFT CONTROL
Filed Aug. 3, 1962  3 Sheets-Sheet 2

INVENTOR
THEODORE WEBER, JR.
BY
Byerly, Townsend, Watson & Churchill
ATTORNEYS.

April 26, 1966 T. WEBER, JR 3,248,624
TAPE CONTROLLED DIGITAL SYNCHRO SIMULATOR FOR SHAFT CONTROL
Filed Aug. 3, 1962 3 Sheets-Sheet 3

INVENTOR
THEODORE WEBER, JR.
BY
Byerly, Townsend, Watson & Churchill
ATTORNEYS.

United States Patent Office 3,248,624
Patented Apr. 26, 1966

1

3,248,624
TAPE CONTROLLED DIGITAL SYNCHRO
SIMULATOR FOR SHAFT CONTROL
Theodore Weber, Jr., Nyack, N.Y., assignor to Howard
Holmes, Incorporated, Elmsford, N.Y., a corporation
of New York
Filed Aug. 3, 1962, Ser. No. 214,542
5 Claims. (Cl. 318—162)

The present invention relates generally to the automatic control of a machine tool and more specifically to an arrangement for automatically positioning a shaft in response to pre-recorded information.

With industry accelerating in its pace to embrace automation the need increases for accurate, flexible and dependable automatic control of its machines. Attempts have been made in the past to employ pre-recorded data for such control. Some of these have used stepwise control of the machine tool relying upon the use of successive differences. That is, the differences between successive adjustments which are required of the tool are computed in advance and this information is employed to step the tool in corresponding incremental fashion. Unfortunately, this technique suffers from the defect that any and all errors are cumulative since each adjustment starts with the assumption that the previous one was correct.

The present invention has for one of its objects the elimination of cumulative errors in stepwise machine tool control. This is accomplished by making use of the dimensional information in a more direct manner such that each adjustment is substantially independent of any prior adjustment.

For the purpose of explanation, it will be convenient to describe the present invention in terms of a typical manufacturing problem, that is, in terms of the cutting of the working surface of a simple flat cam intended for operation with a straight line follower. This represents a two coordinate problem. As the cam rotates, the radial distance to its periphery or to the locus of the cam follower center must vary in accordance with whatever law or function has been prescribed. Hence, we can define the cam in terms of a radial dimension, radius vector or ordinate at each angular position or cam angle.

It will be appreciated that to achieve machining accuracy to the nearest 10,000 of an inch the ordinates, expressed in the decimal system, will normally require numbers of five or more digits (four for the fractional part and at least one for the whole part). Using the binary system of notation, and working only with whole binary numbers, 17 digits are required to express a numerical value of 99,999. Thus, it can be appreciated that any attempt to record the complete ordinate presents a practical problem because of the unduly large recording capacity required. Hence, use of this approach, heretofore, has been limited or handicapped.

It is a further object of the present invention to provide a practical technique for recording and making use of information representative of the actual ordinate or dimensional information. Specifically, the present invention is predicated upon the unique concept of utilizing a given number of the least significant digits of the actual number representing the dimensional information in order to avoid recording the entire number.

The invention may be thought of as a means for rotating a shaft to a prescribed position. Each revolution of the shaft can be divided into a number of equal angular increments equal to one more than the maximum value-significance of the given number of least significant digits which are retained. If, for example, binary notation is employed and six digits are retained, the maximum value-significance would be 63. Therefore, it can be considered that the shaft has 64 definable positions. Retaining two digits from numbers employing decimal notation will afford 99+1 or 100 definable positions.

Now, consider that apparatus is provided which is capable of rotating the shaft toward each definable angular position in that direction which requires the least movement. By selecting the dimensional data to be represented by successive recorded entries such that no two adjacent dimensions differ by an amount corresponding to as much as one half of the number of definable positions (i.e., less than one half revolution of the shaft), all ambiguity is eliminated and the apparatus will position the shaft with complete accuracy, assuming a correct initial shaft setting.

It is believed that the invention will be better understood after reading the following detailed description of one typical embodiment thereof with reference to the appended drawings in which.

A typical cam design problem may be presented by specifying the ordinates as a function of cam angles at sufficient points to enable an equation to be formulated which represents the envelope of the cam surface or the locus of its follower center. In the alternative, the function equation may be presented initially. In either case, employing suitable computing equipment it is possible to calculate the ordinates for equal increments of cam angle throughout one complete revolution. If the slope of the cam is not too great it will be found adequate to calculate the ordinates at 6 minute intervals, i.e., 3600 ordinates. It is preferred to use electronic digital computing equipment for this purpose. In well known manner the calculated values should be rounded off to the nearest 10,000 of an inch or its equivalent.

Figure 1:
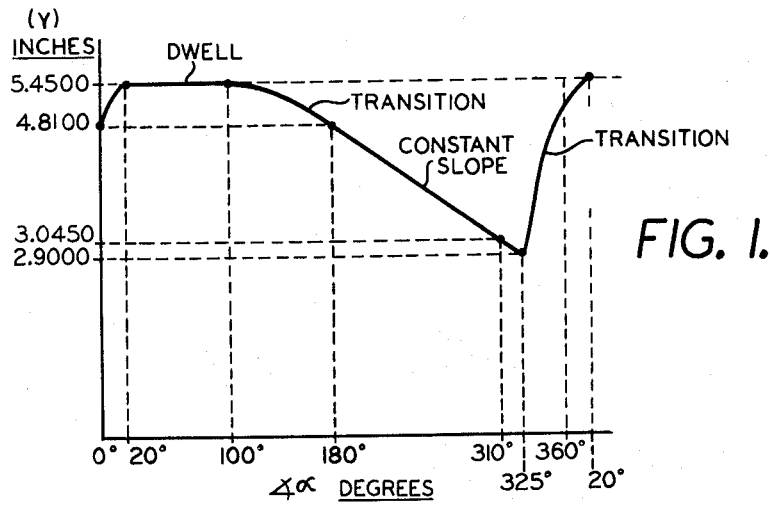
FIGURE 1 is a graph representing the desired characteristics of a cam to be machined.
Figure 2:
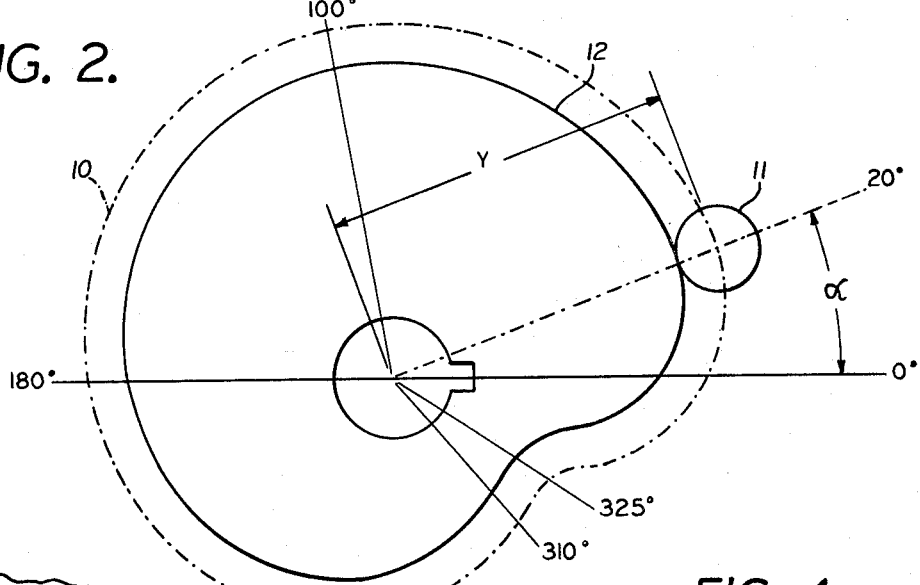
FIGURE 2 is a plan view of the cam with its roller follower.

By way of example, assume that it is desired to produce a cam having a characteristic as shown in FIGURE 1 and an actual configuration as best seen in FIGURE 2. In the figures the cam angle is represented by $\alpha$ and the radius vector or ordinate to the center of the roller follower by the symbol Y. The dot dash line 10 in FIGURE 2 represents the locus of the center of the follower 11 as it rides along the surface of the cam 12. The distance to the center of the follower is used for a reason which will become evident upon understanding the operation of the equipment.

From the graph it will be seen that the cam is to be characterized by a constant slope from a cam angle of 180° to a cam angle of 310°, varying from a radius of 4.8100 inches to a radius of 3.0450 inches. The following tabulation represents a typical sequence of calculated ordinates.

| α | Y |
|---|---|
| 180°0' | 4.8100 |
| 180°6' | 4.8086 |
| 180°12' | 4.8073 |
| 180°18' | 4.8059 |

It should be observed that the values for Y have been rounded off to the nearest 10,000 of an inch. From this point on, the decimal point can be ignored. Furthermore, assume that a 6 digit binary code will be used to position the control shaft of the machine tool. As mentioned above, this enables the shaft to be rotated to 64 definable positions. Hence, the values for Y, represented above in decimal notation, must be converted to binary notation. Since only the six least significant binary digits are of interest, the conversion can be accomplished conveniently by dividing the decimal numbers by 64 (the maximum value-significance of a 6 digit binary number +1). This arithmetical operation yields the following quotients and remainders.

| Decimal Y | $\frac{Y}{64}$ | |
|---|---|---|
| | Quotient | Remainder |
| 48100 | 751 | 36 |
| 48086 | 751 | 22 |
| 48073 | 751 | 9 |
| 48059 | 750 | 59 |

The remainders can be converted readily to binary notation as follows:

| Decimal | Binary |
|---|---|
| 36 | 100100 |
| 22 | 010110 |
| 9 | 001001 |
| 59 | 111011 |

A little reflection will reveal that the binary numbers listed above each consist of the six least significant digits that would exist if the entire number (e.g., 48100) were expressed in binary notation. Of course, where a digital computer of the binary type is employed no specific operation of division is required. It should also be understood that if a different number of digits are to be retained, division would be by the appropriate figure other than 64.

If the interval chosen for calculating the ordinates is not too great it will be found that the maximum value difference between any two successive ordinates will be less than 32. This proves to be the case above where the difference varies between 13 and 14. If this were not the case it would be necessary to reduce the interval. Due to the nature of the equipment to be described hereinafter, it is advisable to allow for a factor of safety by limiting the maximum difference to about 24. This corresponds to a shaft rotation of approximately 135°.

Figure 3:
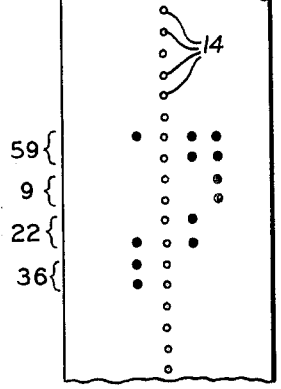
FIGURE 3 shows a portion of a punched tape in accordance with the invention.

Having obtained the six least significant digits from each calculated ordinate, this information is recorded on any suitable recording media. The apparatus being described herein makes use of punched tape, but magnetic tape or punched cards or the like could be used just as well. The portion of the tape punched for the four ordinates listed above is shown in FIGURE 3. The direction of movement of the tape through the reader is represented by the arrow 13 while the decimal equivalents are shown adjacent the left margin of the tape in line with the corresponding recorded binary equivalent. It should be understood that each black dot represents a punched hole. Small drive sprocket holes 14 occupy the center of the tape in well known manner.

Figure 4:
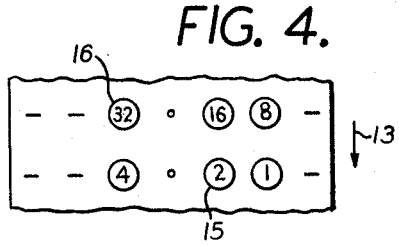
FIGURE 4 represents an enlarged portion of the tape indicating diagrammatically the punching code.

Although the tape employed has space for recording six digits on one line, the illustrative arrangement makes use of two lines for recording in accordance with the system shown in the enlarged fragmentary view of FIGURE 4. Thus, a perforation at location 15 represents a value of two, a perforation at 16 represents a value of thirty two, and so forth. The reason for describing a two-line scheme for recording the six digits is because some digital computers that might be used to control the punching of the tape preempt one of the values from single line representation for actuation of the computer stop function. This is true, for example, of the Royal McBee LGP-30 computer.

Figure 5:
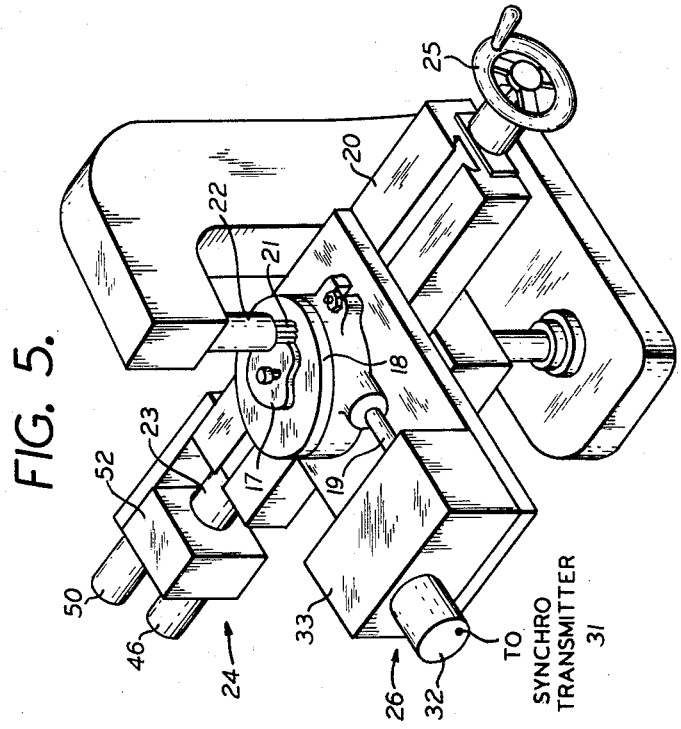
FIGURE 5 is a view of a milling machine adapted for automatic control in accordance with the invention.

The cam is to be produced on a milling machine illustratively shown in FIGURE 5. The cam blank 17 is secured to a rotary feed table 18 driven by shaft 19 and attached to the cross-feed slide or saddle 20. The milling cutter 21 having a diameter equal to the diameter of follower 11 is chucked at the end of the rotatable arbor 22 and held in fixed position while the workpiece is fed to it by the two feeds just mentioned. Adjustment of the cross-feed slide 20 is obtained by rotation of shaft 23 either by means of the drive apparatus indicated generally at 24, or, when that is disengaged, by the hand wheel 25. The shaft 19 is driven by the mechanism indicated generally at 26. The object is to rotate the workpiece in synchronism with the reading of the punched tape and to adjust the cross-feed accordingly.

Figure 6:
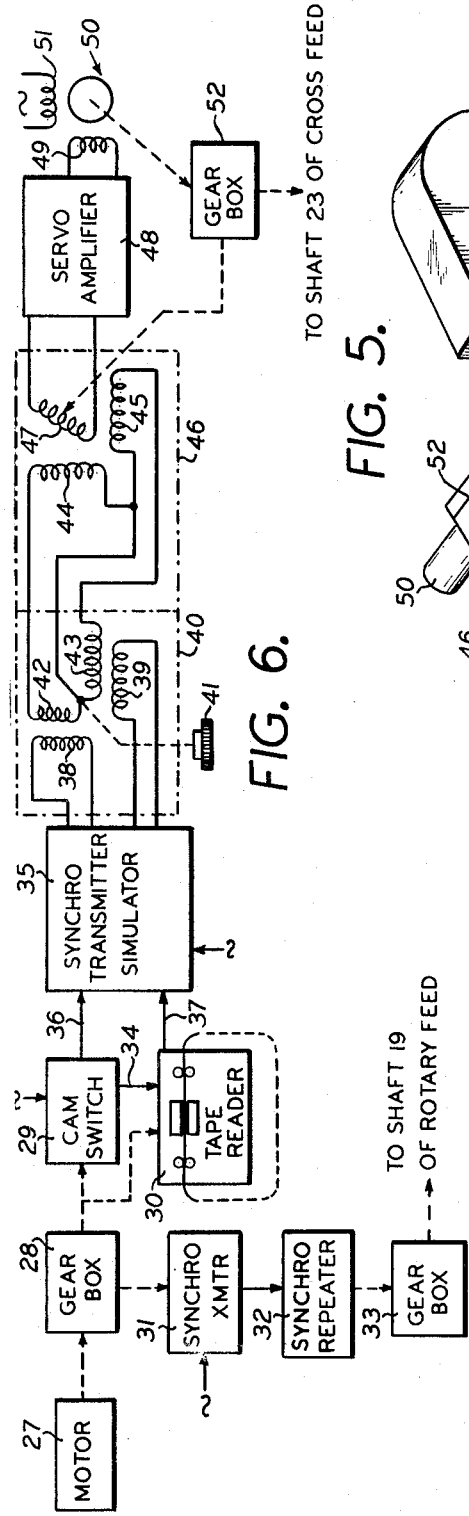
FIGURE 6 is partially a block and partially a schematic diagram illustrating typical control equipment for practicing the invention.

Before completing the description of FIGURE 5, reference should be had to FIGURE 6. A motor 27 is arranged to drive through suitable gearing in gear box 28 a cam switch 29, the tape reader 30, and a synchro transmitter 31. The synchro transmitter 31 is energized from a power source of alternating current and has its output coupled to synchro repeater 32. The latter drives shaft 19 of the milling machine through gearing contained in the gear box 33. See also FIGURE 5. The reason for synchros 31 and 32 is to permit the motor 27 to be located near the tape reader rather than adjacent or on the machine tool.

Assuming that the tape contains ordinate information corresponding to every 6 minutes of cam angle, the gearing in boxes 28 and 33 should be arranged to advance the tape to the next entry for every 6 minutes of arc through which the workpiece is rotated. A stepwise drive of the tape is required and, this can be accomplished by single tooth gearing or any other well known means.

The cam switch 29 is also supplied with alternating current and controls, in turn, the tape reader over connection 34 and a synchro transmitter simulator 35 over connection 36. The tape reader 30 also controls the simulator 35 via connection 37. The details of the simulator will be explained later on. For the present, assume that the simulator which is supplied with alternating current, is capable of providing the necessary currents for energizing the quadrature field windings 38 and 39 of a differential synchro resolver 40. The rotor of resolver 40 is arranged for manual adjustment by knob 41 and contains the two windings 42 and 43 connected as shown.

The output of the differential resolver 40 is coupled in the manner shown to the quadrature field windings 44 and 45 of a synchro repeater 46. The single phase winding 47 of the rotor is connected through a servo amplifier 48 to the control winding 49 of a servo motor or motive member 50. The latter is provided with a reference field winding 51 energized in known manner. The servo motor 50 is arranged to drive mechanically the rotor winding 47 towards null position in a conventional servo loop and to drive shaft 23 of the milling machine through suitable gearing in gear box 52.

Figure 7:
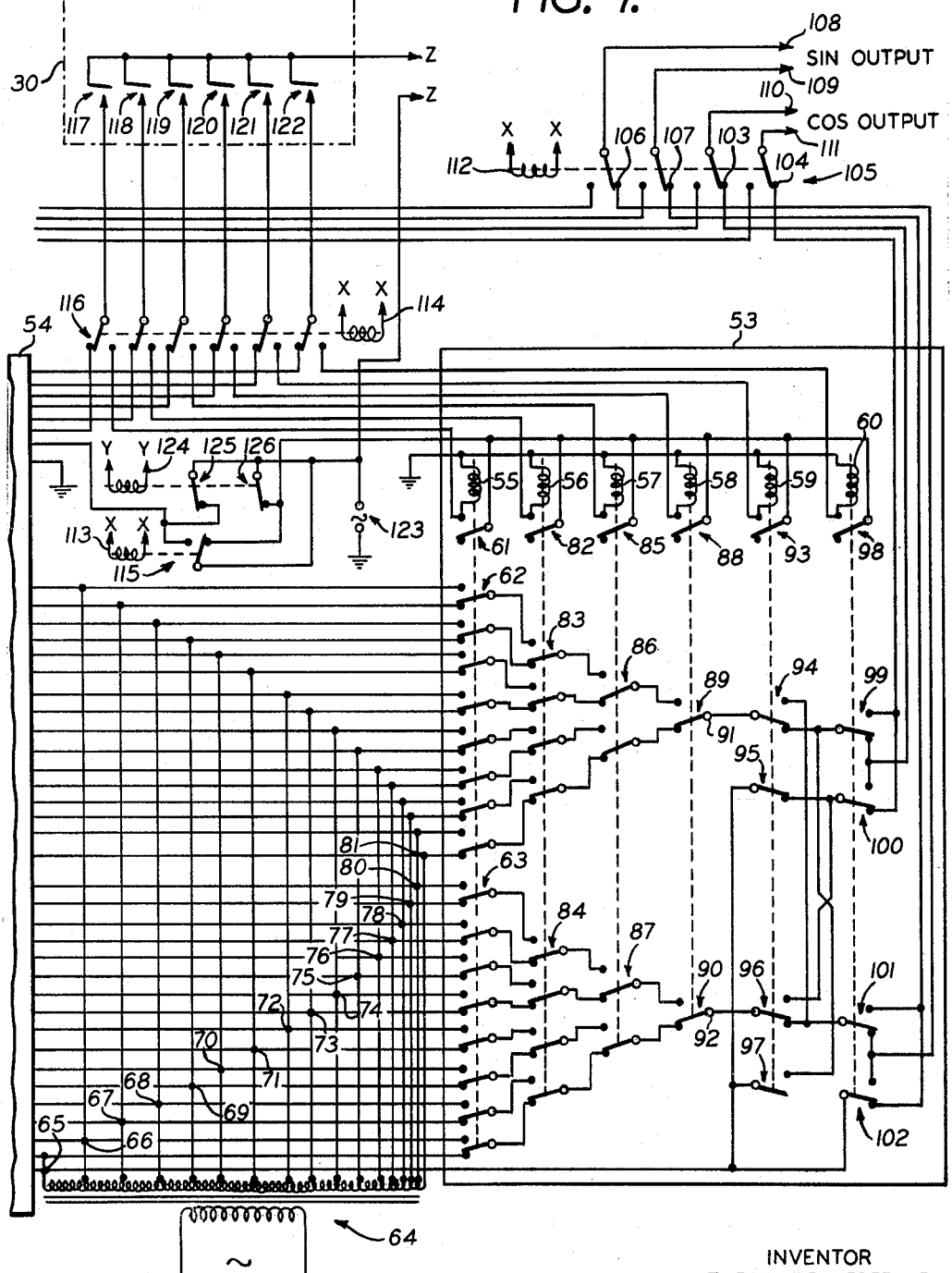
FIGURE 7 is a detailed electrical schematic diagram of the simulator device shown in FIGURE 6.
Figure 8:
FIGURE 8 is a timing chart for use in explaining the operation of the equipment in FIGURES 6 and 7.

Reference should now be had to the details of the synchro transmitter simulator shown in FIGURE 7. In order to permit continuous operation of the machine tool independent of the time required to read successive entries on the recording media the simulator employs two identical information storage banks 53 and 54. While one storage bank is controlling the machine tool the other bank is having its entry changed to the next adjustment set-up. Then the roles of the two banks are interchanged. Cycling of the banks, clearance of old entries, registering of new entries and so forth is controlled by the cam switch 29 in accordance with the timing chart illustrated in FIGURE 8.

Considering storage bank 53 it is provided with input switching relays corresponding in number to the number of recorded digits on the control tape. In this instance there are six represented respectively by the windings 55, 56, 57, 58, 59 and 60.

Winding 55 corresponds to the first denominational order and controls, in addition to holding contacts 61, two sets of 8-pole double-throw switches 62 and 63. The switches 62 and 63 each have sixteen input terminals connected to voltage taps on a transformer 64 as shown.

The taps on transformer 64 are located so as to provide voltages proportional to the sines and cosines of sixteen equi-angular increments within the first quadrant. That is, the voltages at the designated taps are chosen in accordance with the following chart as referenced to the left hand terminal 65 of the transformer.

| Tap | Voltage | | |
|---|---|---|---|
| 65 | $e \sin 0°$ | $= e \cos 90°$ | $= 0$ |
| 66 | $e \sin (1/16 \cdot 90°)$ | $= e \cos (15/16 \cdot 90°)$ | |
| 67 | $e \sin (2/16 \cdot 90°)$ | $= e \cos (14/16 \cdot 90°)$ | |
| 68 | $e \sin (3/16 \cdot 90°)$ | $= e \cos (13/16 \cdot 90°)$ | |
| 69 | $e \sin (4/16 \cdot 90°)$ | $= e \cos (12/16 \cdot 90°)$ | |
| 70 | $e \sin (5/16 \cdot 90°)$ | $= e \cos (11/16 \cdot 90°)$ | |
| 71 | $e \sin (6/16 \cdot 90°)$ | $= e \cos (10/16 \cdot 90°)$ | |
| 72 | $e \sin (7/16 \cdot 90°)$ | $= e \cos (9/16 \cdot 90°)$ | |
| 73 | $e \sin (8/16 \cdot 90°)$ | $= e \cos (8/16 \cdot 90°)$ | |
| 74 | $e \sin (9/16 \cdot 90°)$ | $= e \cos (7/16 \cdot 90°)$ | |
| 75 | $e \sin (10/16 \cdot 90°)$ | $= e \cos (6/16 \cdot 90°)$ | |
| 76 | $e \sin (11/16 \cdot 90°)$ | $= e \cos (5/16 \cdot 90°)$ | |
| 77 | $e \sin (12/16 \cdot 90°)$ | $= e \cos (4/16 \cdot 90°)$ | |
| 78 | $e \sin (13/16 \cdot 90°)$ | $= e \cos (3/16 \cdot 90°)$ | |
| 79 | $e \sin (14/16 \cdot 90°)$ | $= e \cos (2/16 \cdot 90°)$ | |
| 80 | $e \sin (15/16 \cdot 90°)$ | $= e \cos (1/16 \cdot 90°)$ | |
| 81 | $e \sin 90°$ | $= e \cos 0°$ | $= e$ |

Winding 56, corresponding to the second denominational order, controls holding contacts 82 and two sets 83 and 84 of 4-pole double-throw switches all connected as shown.

Winding 57, corresponding to the third denominational order, controls holding contacts 85 and two sets 86 and 87 of 2-pole double-throw switches connected as shown.

Finally, winding 58, corresponding to the fourth denominational order, controls holding contacts 88 and the double-throw switches 89 and 90. For purpose of explanation, the output terminals of switches 89 and 90 will be designated, respectively, 91 and 92.

With windings 55, 56, 57 and 58 all deenergized as shown, a connection can be traced from the terminal 92 back to terminal 65 of the transformer 64. If winding 55 is energized so as to throw its associated switches, terminal 92 will be connected to transformer tap 66. If winding 55 is released and winding 56 energized, terminal 92 is connected to transformer tap 67, and so forth. Assuming that a winding is energized in response to a binary 1 and deenergized in response to a binary 0 it should be apparent that as the value-significance progresses in sequence from zero to 15 the terminal 92 will be connected in sequence from tap 65 to tap 80 of the transformer. Concurrently, the tap 91 of switch 89 will progress in sequence from tap 81 back to tap 66.

Taking as an example the binary number 001001 corresponding to the value 9, and considering only the first four denominational orders represented by the digits 1001, windings 55 and 58 would be energized while 56 and 57 would be deenergized. Terminal 91 can be traced to tap 72 having a voltage proportional to $e \cos (9/16 \cdot 90°)$. Terminal 92 is coupled to tap 74 having a voltage proportional to $e \sin (9/16 \cdot 90°)$.

As described so far, the apparatus is capable of providing voltages corresponding to angles only in one quadrant. Fortuitously, the absolute magnitudes of the sines and cosines of angles repeat in the other three quadrants varying from the first quadrant in a simple organized manner requiring only a change in polarity to represent a change in sign or a transposition. With the aid of the two remaining windings 59 and 60 the necessary inversions or transpositions are obtained.

As shown, winding 59 controls holding contacts 92 and the four switches 94, 95, 96 and 97. In similar manner, winding 60 controls holding contacts 98 and the four switches 99, 100, 101 and 102.

The switches 99 and 100 control the polarity of the signals supplied through contacts 103 and 104 of the four-pole double-throw relay switch 105 to the output designated "cos output." In like manner, switches 101 and 102 control the polarity of the signals supplied through contacts 106 and 107 of switch 105 to the output designated "sin output."

The windings 59 and 60 are arranged to be controlled by the fifth and sixth denominational orders, respectively, of the six digit binary control signal, i.e., the two highest order digits. Still using the number 001001 as an example, it will be understood that windings 59 and 60 will both be deenergized, i.e., they will remain in the positions shown in the drawing while only windings 55 and 58 will be energized. For sake of reference, the sine and cosine output terminals are identified by the numbers 108, 109, 110 and 111. Thus, terminal 108 can be traced through switches 101 and 96 to terminal 92 to receive a voltage proportional to $e \sin (9/16 \cdot 90°)$ and terminal 109 can be traced through switch 102 to the zero reference terminal 65 of the transformer 64.

In similar manner it will be seen that terminal 110 receives a voltage proportional to $e \cos (9/16 \cdot 90°)$ while terminal 111 is connected to the reference tap 65. In other words the signals at the "sin output" and "cos output" may be considered as representative of the angle $9/16 \cdot 90°$ in the first quadrant.

Now assume that the binary control number is changed to 011001. Relay windings 55, 58 and 59 are now actuated while the other windings are deenergized. The value-significance of the binary number is 25. Terminal 108 is now connected to terminal 91 to receive the voltage proportional to $e \cos (9/16 \cdot 90°)$. Terminal 109 remains connected to tap 65. Terminal 110 is now connected to tap 65, and terminal 111 is connected via terminal 92 to the voltage proportional to $e \sin (9/16 \cdot 90°)$. Bearing in mind the following trigonometric relationships, it should be apparent that the "sin output" is receiving a voltage proportional to $\sin (9/16 \cdot 90° + 90°)$ and the "cos output" a voltage proportional to $$\cos (9/16 \cdot 90° + 90°)$$
$$\sin (x + 90°) = +\cos x$$
$$\cos (x + 90°) = -\sin x$$

In other words, actuation of winding 59 effects the equivalent of an angular rotation of 90°. In similar manner it can be demonstrated that actuation of winding 60 effects a rotation of 180° based upon the following relationships, $$\sin (x + 180°) = -\sin x$$
$$\cos (x + 180°) = -\cos x$$

and simultaneous actuation of windings 59 and 60 produces a 270° rotation based upon the relationships $$\sin (x + 270°) = -\cos x$$
$$\cos (x + 270°) = +\sin x$$

The windings 59 and 60 can assume three possible actuated combinations accounting for shifts of the signals received from the lower order switching matrix selectively to signals representing angles in the second, third or fourth quadrants.

Another way of looking at it is that the actuation of relays 59 and 60 corresponds respectively to the addition of 16 and 32. Since 16 represents an angle of 90° (the first quadrant was divided into 16 parts) each additional 16 represents an increase of 90°.

The relay switch 105 is controlled by a winding 112 which is shown with its ends connected to terminals identified by X—X. Connected in parallel with winding 112 are two more windings 113 and 114 controlling, respectively, the switching relays 115 and 116. All of the relays are illustrated in the deenergized condition. Along with the cam switch 29 which supplies the control, relays 105, 115 and 116 constitute the bank switching and selecting means. Bearing in mind that bank 54 is a duplicate of bank 53 it will be seen that relay 105 determines which bank is connected to the output terminals. Relay 116 determines which bank is coupled to the contacts 117 to 122 of the reader 30. And relay 115 determines which bank is supplied with relay holding current from the source 123.

A switching relay having a winding 124 and switches 125 and 126 is energized from terminals Y—Y in a manner and for a purpose to be described. Finally, the common terminals of the reader contacts and the voltage source 123 are connected to a pair of terminals identified as Z—Z.

The terminal designations X—X, Y—Y and Z—Z refer to connections to the cam switch 29. The nature of the cam switch can best be explained with reference to the timing chart of FIGURE 8. It is assumed that the chart depicts one complete cycle of the switch. An arbitrary time base is presented along the bottom edge of the chart. The solid lines on the chart represent the actuation or closed circuit period of the particular function. Thus, the reader is shown in the process of being stepped at time zero and has its reading contacts 117 to 122 closed between times 2 and 6 and between 10 and 14. It is assumed that time 16 corresponds to time zero and that the cycle repeats.

Terminals X—X will be connected by the cam switch to a source of relay energizing current in a known manner during the period from time 8 to 16. In like manner the cam switch will connect terminals Y—Y to a source of energizing current from time 1 to 4 and 9 to 12. Finally, terminals Z—Z will be connected together by the cam switch during times 3 to 5 and 11 to 13.

Thus, at time zero the relays 105, 115, 116 and 124 will be deenergized and terminals Z—Z will be open circuited. Windings 55 to 60 may be in any condition dependant upon the prior history of the circuit. At time 1 winding 124 is energized. This interrupts the connection between the holding contacts of bank 54 and the source of voltage 123 through switch 125. Switch 126 is also opened but a separate circuit can be traced from the holding contacts of bank 53 through switching relay 115 to source 123. Thus, if any of the windings 55 to 60 were energized a holding circuit will prevail through the respective holding contacts to ground. No such holding circuit exists at this time for bank 54 and the six input switching relays therein will all become deenergized and drop out.

At time 2 the contacts in the reader will close through the perforated tape. However, terminals Z—Z are still open circuited and nothing happens until time 3 when these terminals close. This completes a circuit from the power source 123 through those contacts of the reader which are permitted to close by the tape to the appropriate input switching relays of bank 54. At time 4 the relay winding 124 is deenergized so that holding current is again supplied to bank 54 in order to retain the input relays in actuated condition when contacts Z—Z subsequently reopen at time 5. Now bank 54 has been set up and the reader can be advanced starting at time 6 when its contacts open.

At time 8 relays 105, 115 and 116 are energized. This immediately shifts the output from bank 53 to bank 54 for controlling the machine tool. At the same time relay 116 switches the reader to bank 53 and relay 115 removes the overriding holding current circuit from bank 53 and connects it to bank 54. From time 8 to time 16 the input relays of bank 54 will be "locked" and will determine the output. During this same interval, the relays 55 to 60 in bank 53 will be released and reset in accordance with the next recorded entry.

It should be clear to those skilled in the art that the circuit described with reference to FIGURE 7 is arranged to simulate the output of a synchro transmitter and to produce pairs of voltages at its output which will position the shaft of a synchro repeater to any one of 64 different equally spaced positions throughout a complete revolution. It is the "sin output" and the "cos output" of FIGURE 7 which is connected to the differential resolver windings 38 and 39, respectively, of FIGURE 6.

Referring back to FIGURE 6, it will be understood that manual manipulation of knob 41 will superimpose a shift or modify the signals supplied to resolver 40 so as to cause the servo motor 50 to operate accordingly. Since servo motor 50 adjusts the cross feed of the machine tool, the resolver 40 provides means for manual feed thereof.

The overall operation of the equipment can now be described with reference to FIGURES 5 and 6. The prerecorded or punched tape is installed in the reader and, with the cross-feed of the machine tool off to one side so that the workpiece 17 is away from cutter 21, the equipment is cycled first to read one of the tape entries into a storage bank of simulator 35 and then to read out the stored information and obtain an initial setting of servo motor 50, a second entry being stored in the interim. For this initial set-up a predetermined entry is used for which the complete Y dimension is known. It can be arranged that for the first entry on the tape the computer also provides a printed record of the complete ordinate value.

With motor 27 at rest the operator with the aid of knob 41 manually advances the workpiece toward the cutter until the cut is about .010″ in excess of the true dimension. Motor 27 can now be started resulting in automatic feed of the workpiece to produce a roughing cut. At the completion of the roughing cut the operator can slowly advance the workpiece by adjusting knob 41 to produce either an intermediate cut or the finishing cut. If necessary, the operator can make a predetermined adjustment of knob 41 at each reversal of direction to compensate for any known backlash in the lead screw or shaft 23 of cross-feed slide 20.

The invention has been described with reference to a single specific embodiment. However, the basic concepts can be generalized and extended.

Considering only the use of binary notation the operation of the synchro transmitter simulator can be broken down first into means responsive to all but the two highest order digits for producing pairs of signals (e.g., at terminals 91 and 92) proportional to cos $\psi$ and $\psi$ where $$\psi = \frac{\sum_{n=1}^{n-2} 2^{n-1} b_n}{2^{N-2}} \cdot 90°$$

and $b_n$ represents the denomination of the $n^{\text{th}}$ denominational order of an N digit binary number where N is greater than two.

The second part of the simulator constitutes means responsive to the two highest order digits for operating on the above mentioned pairs of signals to produce further pairs of signals (the actual output of the simulator) proportional to cos θ and sin θ where $$\theta = \psi + \left[ \sum_{n=N-1}^{n=N} 2^{n-N+1} b_n \right] \cdot 90°$$

and represents the angle to which the shaft of the synchro repeater is positioned ignoring any shift produced by the differential resolver. In the claims the added shift introduced by the differential resolver will be represented by the symbol $\phi$.

Since certain basic aspects of the invention are not restricted to the use of binary notation the concept can be further generalized by stating that the output of the simulator corresponds to $$\sin\left(\frac{\mu}{\lambda+1} \cdot 360°\right) \text{ and } \cos\left(\frac{\mu}{\lambda+1} \cdot 360°\right)$$

where $\mu$ is the actual value-significance and $\lambda$ is the maximum value-significance of an N digit number where N is greater than one.

The source of alternating current represented by transformer 64 must be capable of providing voltages proportional to the sines and cosines of the angles dividing the first quadrant into $$\frac{\lambda+1}{4}$$

equal parts where $\lambda$ is as defined above and $$\frac{\lambda+1}{4}$$

defines a whole number greater than one. Based upon this same notation the maximum difference between the longer numbers represented by any two successive entries on the recording media must be less than $$\frac{\lambda+1}{2}$$

(this assumes that the longer numbers, due to truncation or otherwise, all terminate in a least significant digit of the same order and that the decimal point, if present, is ignored, as described previously).

Although the invention has been described only with reference to the machining of a simple flat cam it should be understood that it is applicable to any automatic control problem which can be reduced to the operation of one shaft as a dependent function of the rotation of another.

Having described the invention with reference to a typical embodiment thereof it will appear to those skilled in the art that numerous changes may be made therein without departing from its true spirit as defined in the appended claims.

What is claimed is:

1. Apparatus for positioning a shaft in accordance with a pre-recorded schedule comprising:
    recording media for supplying input data to an automated reader, said media containing successive entries in machine language, each entry representing in a given numbering system the N least significant digits of a corresponding longer number representing dimensional information defining a discrete shaft position taking into account multiple as well as fractional rotation thereof with N being greater than one and with all of said longer numbers terminating in a least significant digit of the same order, the maximum difference between any two of said longer numbers represented by two successive entries in the recording media being less than $$\frac{\lambda+1}{2}$$

where $\lambda$ is a defined hereinafter and the decimal point, if present, is ignored,
    an automated reader of said recording media,
    means for converting an N digit digital input into a pair of signal voltages proportional, respectively, to $$\left(\frac{\mu}{\lambda+1} \cdot 360°\right) \text{ and } \cos\left(\frac{\mu}{\lambda+1} \cdot 360°\right)$$

where $\mu$ is the instantaneous value-significance and $\lambda$ is the maximum value-significance of said digital input,
    means coupling said reader directly to an input of said converting means for supplying said digital input thereto, said coupling means having a capacity of N digits,
    a resolver having a pair of quadrature field windings and a rotor winding,
    a servo motor,
    means coupling the rotor winding of said resolver to said motor in a servo loop,
    means coupling said motor in driving relation to said shaft,
    and means coupled thereto for coupling said pair of signal voltages from said converting means to said resolver field windings.

2. Apparatus for controlling a first rotary shaft controlled feed of a machine tool as a function of the rotation of the shaft of a second such feed comprising:
    recording media for supplying input data to an automated reader, said media containing successive entries in machine language, each entry representing in a given numbering system the N least significant digits of a corresponding longer number representing the dimensional information defining the adjustment of the first feed relative to a given point on a workpiece, N being greater than one and all of said longer numbers terminating in a least significant digit of the same order, the maximum difference between any two of said longer numbers represented by two successive entries in the recording media being less than $$\frac{\lambda+1}{2}$$

where $\lambda$ is as defined hereinafter and the decimal point, if present, is ignored,
    an automated reader for said recording media,
    means coupled thereto for driving said reader in synchronism with said second feed,
    means for converting an N digit digital input into a pair of signal voltages proportional, respectively, to $$\left(\frac{\mu}{\lambda+1} \cdot 360°\right) \text{ and } \cos\left(\frac{\mu}{\lambda+1} \cdot 360°\right)$$

where $\mu$ is the instantaneous value-significance and $\lambda$ is the maximum value-significance of said digital input,
    means coupling said reader directly to an input of said converting means for supplying said digital input thereto, said coupling means having a capacity of N digits,
    and a servo loop including a synchro resolver input responsively coupled to said converting means and a motive member output drivingly coupled to the shaft controlling said first feed for positioning said first feed as a function of said pair of signal voltages.

3. Apparatus for controlling a first rotary shaft controlled feed of a machine tool as a function of the rotation of the shaft of a second such feed comprising:
    recording media for supplying input data to an automated reader, said media containing successive entries in machine language, each entry representing in a given numbering system the N least significant digits of a corresponding longer number representing the dimensional information defining the adjustment of the first feed relative to a given point on a workpiece, N being greater than one and all of said longer numbers terminating in a least significant digit of the same order, the maximum difference between any two of said longer numbers represented by two successive entries in the recording media being less than $$\frac{\lambda+1}{2}$$

where $\lambda$ is as defined hereinafter and the decimal point, if present, is ignored, an automated reader for said recording media, means coupled thereto for driving said reader in synchronism with said second feed, means for converting an N digit digital input into a pair of signal voltages proportional, respectively, to $$\sin\left(\frac{\mu}{\lambda+1}\cdot 360°\right) \text{ and } \cos\left(\frac{\mu}{\lambda+1}\cdot 360°\right)$$

where $\mu$ is the instantaneous value-significance and $\lambda$ is the maximum value-significance of said digital input, means coupling said reader directly to an input of said converting means for supplying said digital input thereto, said coupling means having a capacity of N digits, adjustable differential synchro resolver means coupled to said converting means for modifying said pair of signal voltages to produce a second pair of signal voltages proportional, respectively, to $$\sin\left(\frac{\mu}{\lambda+1}\cdot 360°+\phi\right) \text{ and } \cos\left(\frac{\mu}{\lambda+1}\cdot 360°+\phi\right)$$

where $\phi$ is a variable determined by the adjustment of the differential means, and a servo loop including a synchro resolver input responsively coupled to said differential means and a motive member output drivingly coupled to the shaft controlling said first feed for positioning said first feed as a function of said second pair of signal voltages.

4. Apparatus according to claim 3, wherein said means for converting a digital input into a pair of signal voltages comprises two identical converting stages, and wherein the means coupling said converting means to said reader and to said differential resolver includes switching means for alternately coupling one of said stages to the reader and the other stage to the differential resolver and then interchanging the stages for continuous uninterrupted control of the shaft.

5. Apparatus for positioning a shaft in accordance with a pre-recorded schedule comprising:

recording media for supplying input data to an automated reader, said media containing successive entries in machine language, each entry representing in a given numbering system the N least significant digits of a corresponding longer number representing dimensional information defining a discrete shaft position taking into account multiple as well as fractional rotation thereof with N being greater than one and with all of said longer numbers terminating in a least significant digit of the same order, the maximum difference between any two of said longer numbers represented by two successive entries in the recording media being less than $$\frac{\lambda+1}{2}$$

where $\lambda$ is as defined hereinafter and the decimal point, if present, is ignored, an automated reader for said recording media, means for converting an N digit digital input into a pair of signal voltages proportional, respectively, to $$\sin\left(\frac{\mu}{\lambda+1}\cdot 360°\right) \text{ and } \cos\left(\frac{\mu}{\lambda+1}\cdot 360°\right)$$

where $\mu$ is the instantaneous value-significance and $\lambda$ is the maximum value-significance of said digital input, means coupling said reader directly to an input of said converting means for supplying said digital input thereto, said coupling means having a capacity of N digits, a resolver having a pair of quadrature field windings and a rotor winding, a servo motor, means coupling the rotor winding of said resolver to said motor in a servo loop, means coupling said motor in driving relation to said shaft, and adjustable differential synchro resolver means coupling said converting means to said resolver field windings for modifying said pair of signal voltages to produce a second pair of signal voltages for energizing said field windings, said second pair of voltages being proportional, respectively, to $$\sin\left(\frac{\mu}{\lambda+1}\cdot 360°+\phi\right) \text{ and } \cos\left(\frac{\mu}{\lambda+1}\cdot 360°+\phi\right)$$

where $\phi$ is a variable determined by the adjustment of the differential means.

References Cited by the Examiner
UNITED STATES PATENTS

| | | | |
|---|---|---|---|
| 2,808,547 | 10/1957 | Adler et al. | 318—24 |
| 2,817,078 | 12/1957 | Pfeiffer | 318—24 X |
| 2,839,711 | 6/1958 | Tripp | 318—162 |
| 2,849,668 | 8/1958 | Tripp. | |
| 2,853,699 | 9/1958 | O'Neil | 318—24 X |
| 2,950,427 | 8/1960 | Tripp | 318—28 |
| 2,969,534 | 1/1961 | Fisher | 318—28 X |
| 2,976,467 | 3/1961 | McCoy | 318—28 |
| 3,025,442 | 3/1962 | Wolff | 318—24 |
| 3,039,030 | 6/1962 | Weidner. | |
| 3,040,221 | 6/1962 | Fitzner. | |
| 3,064,168 | 11/1962 | Dosch | 318—448 X |
| 3,064,169 | 11/1962 | Mynall. | |
| 3,083,323 | 3/1963 | Vigour. | |
| 3,141,120 | 7/1964 | Johnson et al. | |

ORIS L. RADER, *Primary Examiner.*